(12) United States Patent
Lautenschlaeger et al.

(10) Patent No.: US 10,327,968 B1
(45) Date of Patent: Jun. 25, 2019

(54) JUMPSEAT FOR AN EMERGENCY TRANSPORT VEHICLE

(71) Applicants: Siemens Healthcare GmbH, Erlangen (DE); DEDICATED2IMAGING, LLC, Portsmouth, NH (US)

(72) Inventors: Stefan Lautenschlaeger, Fürth (DE); Eric Bailey, North Hampton, NH (US); Charles Landry, Seabrook, NH (US); Frank Berger, Erlangen (DE)

(73) Assignees: Siemens Healthcare GmbH, Erlangen (DE); Dedicated2Imaging, LLC, Portsmouth, NH (US)

( * ) Notice: Subject to any disclaimer, the term of this patent is extended or adjusted under 35 U.S.C. 154(b) by 0 days.

(21) Appl. No.: 15/831,824

(22) Filed: Dec. 5, 2017

(51) Int. Cl.
*A61G 3/00* (2006.01)
*B60N 2/30* (2006.01)

(52) U.S. Cl.
CPC ........... *A61G 3/005* (2013.01); *B60N 2/3043* (2013.01); *B60N 2/3075* (2013.01)

(58) Field of Classification Search
CPC ...... A61G 3/003; A61G 3/005; B60N 2/3072; B60N 3/3075; B60N 3/79; B60N 2/3043; B60N 2/304; B60N 3/3079
USPC .............................. 296/65.05, 65.11; 297/15
See application file for complete search history.

(56) References Cited

U.S. PATENT DOCUMENTS

| | | | |
|---|---|---|---|
| 3,359,928 A * | 12/1967 | Gamble | A01K 97/10 248/514 |
| 5,755,478 A | 5/1998 | Kamiya et al. | |
| 6,234,553 B1 * | 5/2001 | Eschelbach | B60N 2/015 296/65.05 |
| 6,625,252 B2 | 9/2003 | Mirabella | |
| 7,029,063 B2 * | 4/2006 | Holdampf | B60N 2/206 297/15 |
| 7,794,001 B2 | 9/2010 | Blackwell et al. | |
| 7,850,220 B2 * | 12/2010 | Holdampf | B60N 2/3011 296/65.09 |
| 8,382,181 B2 | 2/2013 | Bourgraf et al. | |
| 8,459,714 B2 | 6/2013 | Pomper et al. | |
| 8,616,604 B2 | 12/2013 | Bourgraf et al. | |
| 9,027,978 B2 | 5/2015 | Bourgraf et al. | |
| 9,295,595 B2 | 3/2016 | Bourgraf et al. | |
| 9,414,749 B2 | 8/2016 | Semenov | |
| 9,675,255 B2 * | 6/2017 | Semenov | A61B 5/0073 |

(Continued)

FOREIGN PATENT DOCUMENTS

| | | | |
|---|---|---|---|
| DE | 1566418 | * | 1/1970 |
| EP | 0274696 A2 | | 12/1987 |
| GB | 190907326 A | | 1/1910 |

*Primary Examiner* — Dennis H Pedder

(57) ABSTRACT

A jumpseat for an emergency transport vehicle having a patient compartment that includes a medical scanning device and a patient stretcher having a stretcher axis. The jumpseat includes a post element rotatably attached to a floor portion of the patient compartment, wherein the floor portion is located in a clearance space between the scanning device and a head end of the stretcher. The jumpseat also includes a seating element rotatably attached to the post element. The post and seating elements are moveable between a stowed position wherein the post element and seating element are substantially horizontal and a deployed position wherein the post element is substantially vertical and the seating element is substantially horizontal and located in the clearance space and in-line with a patient's body axis.

14 Claims, 3 Drawing Sheets

(56) References Cited

U.S. PATENT DOCUMENTS

| | | | |
|---|---|---|---|
| 2014/0239662 A1* | 8/2014 | Kim | B60N 2/3031 296/65.05 |
| 2016/0158077 A1 | 6/2016 | Bourgraf et al. | |
| 2016/0304007 A1 | 10/2016 | Bourgraf et al. | |
| 2017/0231843 A1 | 8/2017 | Thompson | |

* cited by examiner

JUMPSEAT FOR AN EMERGENCY TRANSPORT VEHICLE

TECHNICAL FIELD

The invention relates to emergency transport vehicles and more particularly, to a jumpseat for an emergency transport vehicle having a patient compartment that includes a medical scanning device and a patient stretcher wherein the jumpseat is moveable between a stowed position wherein a post element and a seating element are substantially horizontal and a deployed position wherein the post element is substantially vertical and the seating element is substantially horizontal and located in a clearance space between the scanning device and a head end of the stretcher and in-line with a patient's body axis.

BACKGROUND

Emergency transport vehicles, such as ambulances, typically include a dedicated seat that is used for performing a medical procedure, such as an intubation procedure, on a patient. Referring to FIG. 1, an interior portion 10 of an ambulance is shown which depicts a dedicated seat 12 used for performing an intubation or other medical procedure. The seat 12 is located behind, or opposite, a head-end 14 of a patient stretcher 16. The seat 16 locates medical personnel, such as a physician or paramedic, in a preferred position that is in-line with a patient's longitudinal body axis so that a safe and successful intubation of the patient is performed. For purposes of illustration, a patient's longitudinal body axis corresponds to stretcher axis 17.

Referring to FIG. 2, an interior portion 12 of an ambulance configured as a mobile stroke unit (MSU) is shown. In this configuration, the space behind, or opposite, the head-end 14 of the stretcher 16 is occupied instead by medical equipment such as computed tomography (CT) scanner 18. Thus, space for a head-sided seat 14, such as in a conventional ambulance (see FIG. 1), is not available. As a result, medical personnel must employ workaround solutions to perform an intubation such as either standing or kneeling in between the stretcher 16 and the CT scanner 18 or using a seat or bench that is parallel to the stretcher 16 (i.e. parallel to the stretcher axis 17). However, both solutions are not desirable because a paramedic's ability to position themselves in-line with the stretcher axis 17 and thus with the patient's longitudinal body axis is substantially impaired or not possible, thus compromising the ability to provide a safe and successful intubation of the patient.

SUMMARY OF THE INVENTION

A jumpseat is disclosed for an emergency transport vehicle having a patient compartment that includes a medical scanning device and a patient stretcher having a stretcher axis. The jumpseat includes a post element rotatably attached to a floor portion of the patient compartment, wherein the floor portion is located in a clearance space between the scanning device and a head end of the stretcher. The jumpseat also includes a seating element rotatably attached to the post element. The post and seating elements are moveable between a stowed position wherein the post element and seating element are substantially horizontal and a deployed position wherein the post element is substantially vertical and the seating element is substantially horizontal and located in the clearance space and in-line with a patient's body axis.

A method is disclosed for moving a jumpseat in an emergency transport vehicle having a patient compartment that includes a medical scanning device and a patient stretcher having a stretcher axis that corresponds to a patient's body axis. The method includes moving a lift element in a vertical direction relative to a floor portion located in a clearance space between the scanning device and a head end of the stretcher. In addition, the method includes moving a seating element attached to the lift element wherein the lift and seating elements are moveable between a stowed position wherein the lift and seating elements are substantially horizontal and a deployed position wherein the seating element is located in the clearance space and in-line with a patient's body axis.

Those skilled in the art may apply the respective features of the present invention jointly or severally in any combination or sub-combination.

BRIEF DESCRIPTION OF DRAWINGS

The exemplary embodiments of the invention are further described in the following detailed description in conjunction with the accompanying drawings, in which.

To facilitate understanding, identical reference numerals have been used, where possible, to designate identical elements that are common to the figures. The figures are not drawn to scale.

DESCRIPTION OF EMBODIMENTS

Figure 1:
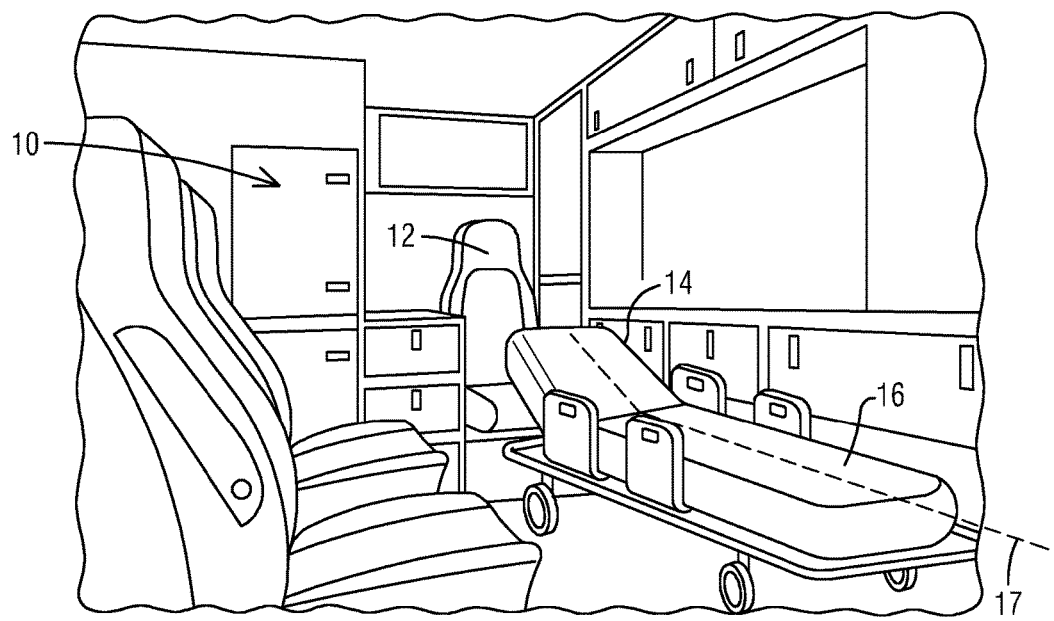
FIG. 1 shows an interior portion of an ambulance and depicts a dedicated seat used for performing an intubation.
Figure 2:
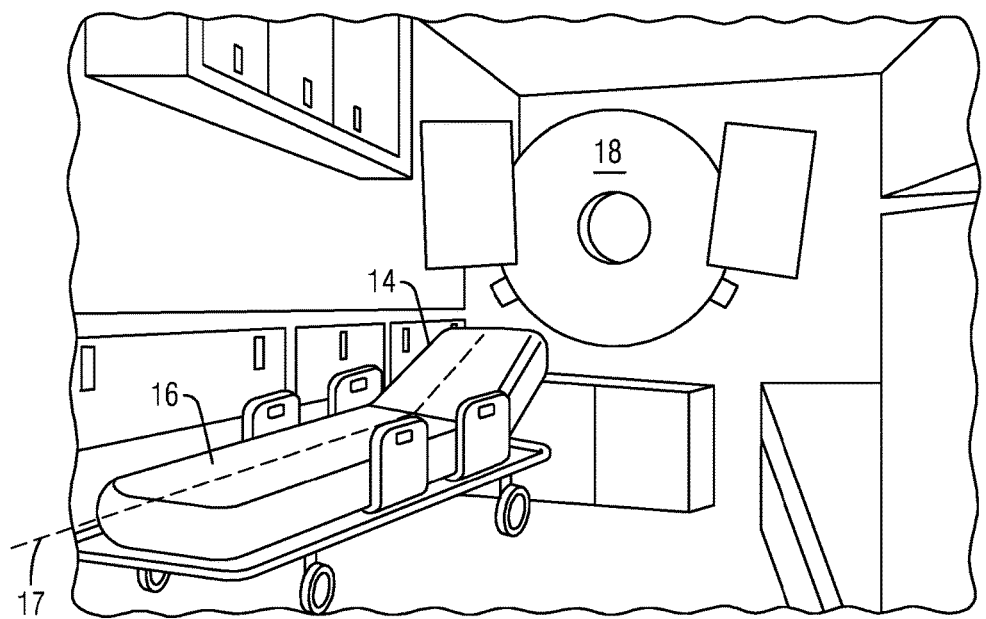
FIG. 2 shows an interior portion of an ambulance configured as a mobile stroke unit (MSU).

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

In accordance with an aspect of the invention, a jumpseat is disclosed that may be used in an emergency transport vehicle, such as an ambulance configured as a mobile stroke unit (MSU), or other types of vehicles that do not provide a dedicated seat located at a head end of a patient. For purposes of illustration, the invention will be described in connection with an ambulance configured as an MSU.

Figure 3:
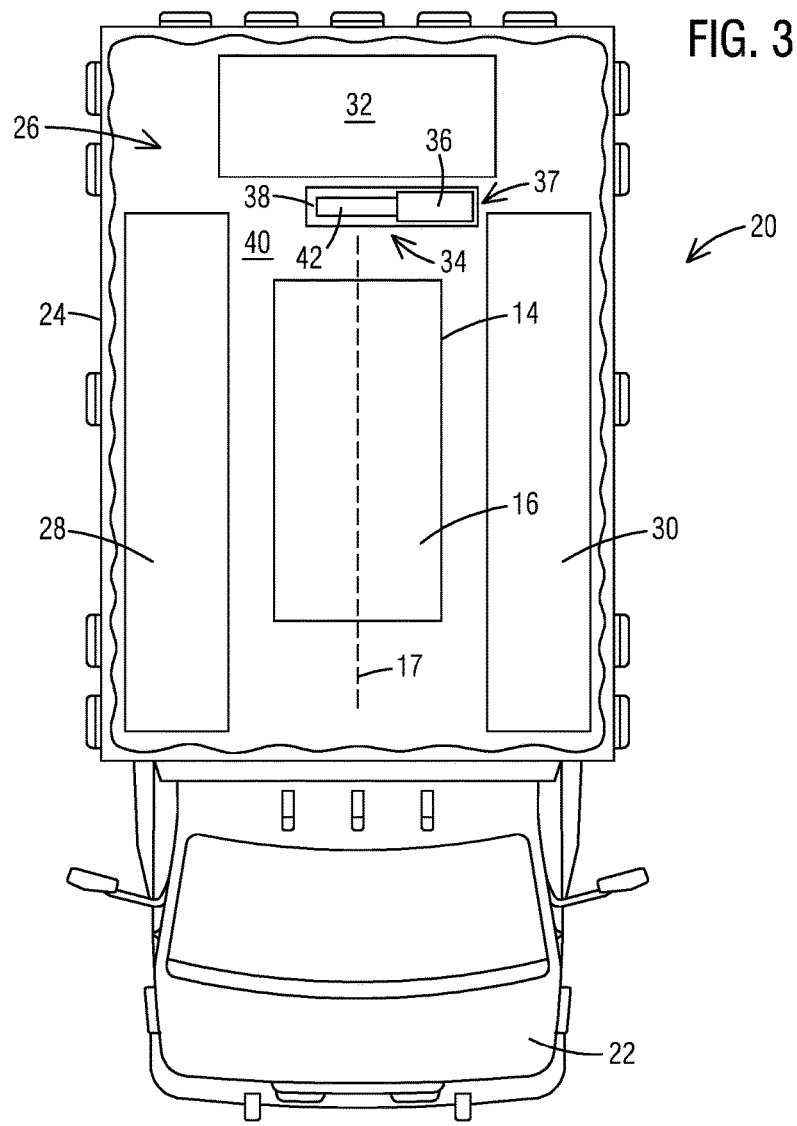
FIG. 3 is a schematic top view of an ambulance configured as an MSU having an operator cab portion and a patient compartment that includes a jumpseat in accordance with the invention.

Referring to FIG. 3, a schematic top view is shown of an ambulance 20 configured as an MSU a having an operator cab portion 22 and a patient compartment 24 that receives and treats a patient. In particular, FIG. 3 depicts an interior portion 26 of the patient compartment 24. The patient compartment 24 includes the stretcher 16 which is located between first 28 and second 30 rows of benches, seats, cabinets and other known ambulance equipment. The patient compartment 24 also includes a medical scanning device 32 such as a CT scanner that is spaced apart from the head-end 14 of the stretcher 16 to form a clearance space 34 between the scanning device 32 and the head-end 14 of the stretcher 16.

Figure 3A:
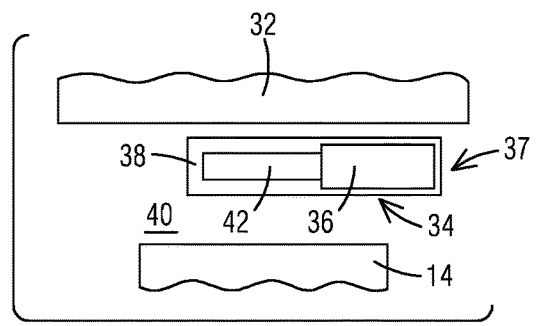
FIG. 3A is an enlarged view of the jumpseat shown in FIG. 3 in a stowed position.

In accordance with an aspect of the invention, the patient compartment 24 further includes an emergency jumpseat 37 that is moveable between a down or stowed position and an up or deployed position. The jumpseat 37 includes a seating element 36 and a rotatable seatpost 42. FIG. 3A is an enlarged view of the jumpseat 37 in the stowed position. In the stowed position, the seating element 36 and seatpost 42 are folded into a receptacle 38 formed in a floor portion 40 of the patient compartment 24 located in the clearance space 34. The receptacle 38 may be covered by a floor panel (not shown for purposes of clarity) that forms part of the floor portion 40 to enable walking and use of the clearance space 34 by medical personnel.

Figure 4:
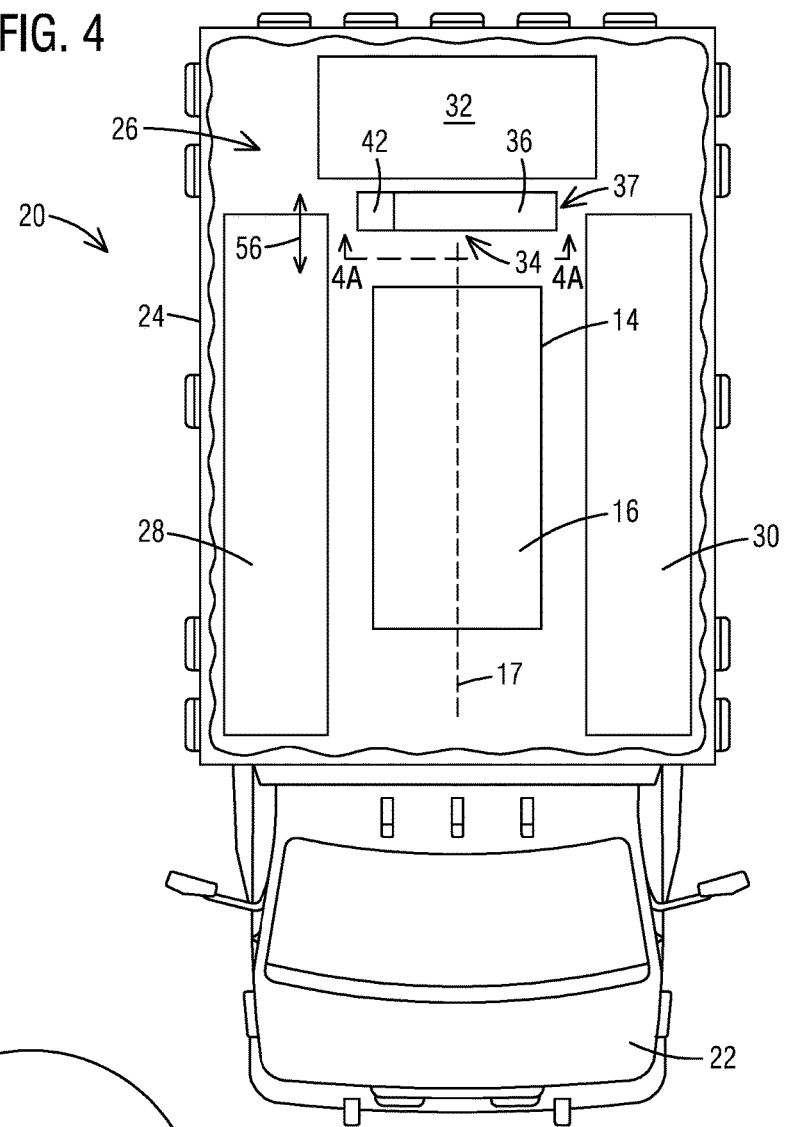
FIG. 4 is a schematic top view of the ambulance shown in FIG. 3 and shows the jumpseat in the deployed position.
Figure 4A:
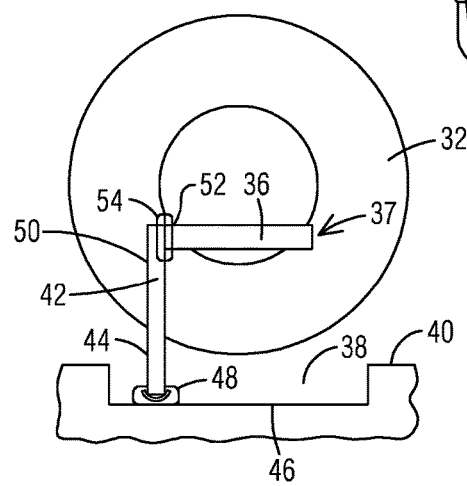
FIG. 4A is a view of the jumpseat along view line 4A-4A of FIG. 4.

Referring to FIGS. 4 and 4A, the jumpseat 37 is shown in the deployed position. FIG. 4A is a view of the jumpseat 37 along view line 4A-4A of FIG. 4. When the jumpseat 37 is needed during an emergency, for example, the jumpseat 37 is lifted from the floor portion 40 and extended into the deployed position. In the deployed position, the seating element 36 is located at a predetermined height above the floor portion 40, at the head end 14 of the stretcher 16 and in-line with the stretcher axis 17. This provides suitable seating for medical personnel that is in-line with a patient's body axis to facilitate intubation of the patient and perform other medical procedures or tasks.

The seating element 36 is supported by the seatpost 42. A bottom portion 44 of the seatpost 42 is rotatably connected to a wall 46 of the receptacle 38 by a first hinge 48. A top portion 50 of the seatpost 42 is rotatably connected to an end portion 52 of the seating element 36 by a second hinge 54. The first hinge 48 enables rotation of the seatpost 42 relative to the floor portion 40 and the second hinge 54 enables rotation of the seating element 36 relative to the seatpost 42. In the stowed position, the seatpost 42 and seating element 36 are oriented substantially horizontally within the receptacle 38 as shown in FIGS. 3 and 3A. In order to move the seating element 36 to the deployed position, the seatpost 42 is rotated about the first hinge 48 relative to the floor portion 40 to a substantially vertical position that also lifts or elevates the seating element 36 from the floor portion 40. The seating element 36 is then rotated about the second hinge 54 relative to the vertical seatpost 42 to a substantially horizontal position suitable for providing seating for medical personnel. The first 48 and second 54 hinges may be commercially available hinges such as those sold by Heyman Manufacturing GmbH, of Giessen, Germany.

In an embodiment, the seatpost 42 and seating element 36 may be locked in the vertical and horizontal positions by associated locking elements. In addition, the first 48 and second 54 hinges may each include a spring mechanism to provide a spring bias that facilitates rotation of the seatpost 42 and the seating element 36. In another embodiment, the seatpost 42 may have a telescopic arrangement that enables the seatpost 42 to be extended substantially vertically from the receptacle 38 to position the jumpseat 37 in the deployed position. The seatpost 42 may then be retracted or collapsed into the receptacle 38 when not in use. In another embodiment, a scissor lift arrangement may be used to move the jumpseat 37 between the stowed and deployed positions. Alternatively, a gear arrangement such as a rack and pinion arrangement may be used to move the jumpseat 37 between the stowed and deployed positions. It is understood that other extendable and retractable mechanisms, devices or linkages may be used to move the jumpseat 37 between the stowed and deployed positions.

In another embodiment, the scanning device 32 may be moveable and/or reconfigured by removing components in front of the scanning device 32, thus increasing the amount of clearance space 34. In accordance with as aspect of the invention, the second hinge 54 includes a track or guide arrangement to enable movement of the seating element 36 in an axial direction 56 in-line with the stretcher axis 17 to move into the increased space created by movement and/or reconfiguring of the scanning device 32 to provide additional space in between the scanning device 32 and the stretcher 16 for medical personnel.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A jumpseat for an emergency transport vehicle having a patient compartment that includes a medical scanning device and a patient stretcher having a stretcher axis that corresponds to a patient's body axis, comprising:
   a post element attached to a floor portion of the patient compartment, wherein the floor portion includes a receptacle and wherein the floor portion is between the scanning device and a head end of the stretcher and wherein the post element is moveable in a vertical direction; and
   a seating element attached to the post element wherein the seating element is moveable relative to the post element and wherein the post and seating elements are moveable between a stowed position wherein the post and seating elements are substantially horizontal and located in the receptacle and a deployed position wherein the post element is substantially vertical and the seating element is substantially horizontal and in-line with a patient's body axis wherein the post element supports an end of the seating element to provide a cantilevered seating element sized to fit between the scanning device and the head end of the stretcher.

2. The jumpseat according to claim 1, wherein the post element is attached to the floor portion by a first hinge and the seating element is attached to the post element by a second hinge.

3. The jumpseat according to claim 1, wherein the scanning device is a computed tomography (CT) scanner.

4. The jumpseat according to claim 1, wherein the emergency transport vehicle is configured as a mobile stroke unit.

5. A method for moving a jumpseat in an emergency transport vehicle having a patient compartment that includes a medical scanning device and a patient stretcher having a stretcher axis that corresponds to a patient's body axis, comprising:
   moving a post element in a vertical direction relative to a floor portion located between the scanning device and a head end of the stretcher wherein the floor portion includes a receptacle; and
   moving a seating element attached to the post element wherein the post and seating elements are moveable between a stowed position wherein the post and seating elements are substantially horizontal and located in the receptacle and a deployed position wherein the seating element is in-line with a patient's body axis and wherein the post element is substantially vertical and the seating element is substantially horizontal wherein the post element supports an end of the seating element to provide a cantilevered seating element sized to fit between the scanning device and the head end of the stretcher.

6. The method according to claim 5, wherein the post element is attached to the floor portion by a first hinge to enable rotation of the post element relative to the floor portion.

7. The method according to claim 6, wherein the seating element is attached to the post element by a second hinge to enable rotation of the seating element relative to the post element.

8. The method according to claim 5, wherein the scanning device is a computed tomography (CT) scanner.

9. The method according to claim 5, wherein the emergency transport vehicle is configured as a mobile stroke unit.

10. A jumpseat for an emergency transport vehicle having a patient compartment that includes a medical scanning device and a patient stretcher having a stretcher axis that corresponds to a patient's body axis, comprising:
    a post element rotatably attached to a floor portion of the patient compartment, wherein the floor portion includes a receptacle and wherein the floor portion is between the scanning device and a head end of the stretcher and wherein the post element is rotatable relative to the floor portion; and
    a seating element rotatably attached to the post element to enable rotation of the seating element relative to the post element wherein the post and seating elements are moveable between a stowed position wherein the post and seating elements are substantially horizontal and located in the receptacle and a deployed position wherein the post element is substantially vertical and the seating element is rotated relative to the post element into a substantially horizontal position and in-line with a patient's body axis wherein the post element supports an end of the seating element to provide a cantilevered seating element sized to fit between scanning device and the head end of the stretcher.

11. The jumpseat according to claim 10, wherein the post element is attached to the floor portion by a first hinge to enable rotation of the post element relative to the floor portion.

12. The jumpseat according to claim 11, wherein the seating element is attached to the post element by a second hinge to enable rotation of the seating element relative to the post element.

13. The jumpseat according to claim 10, wherein the scanning device is a computed tomography (CT) scanner.

14. The jumpseat according to claim 10, wherein the emergency transport vehicle is configured as a mobile stroke unit.

* * * * *